United States Patent [19]

Telford

[11] 4,266,646
[45] May 12, 1981

[54] WHEEL STUD MOUNTED LOCKING CLUTCH

[75] Inventor: Thomas M. Telford, Gladstone, Oreg.

[73] Assignee: Warn Industries, Inc., Seattle, Wash.

[21] Appl. No.: 957,736

[22] Filed: Nov. 6, 1978

[51] Int. Cl.³ .......................... F16D 1/06; B60B 27/00
[52] U.S. Cl. .................................. 192/67 R; 192/94; 403/1
[58] Field of Search .................. 192/49, 67 R, 94, 50; 403/1

[56] References Cited

U.S. PATENT DOCUMENTS

| | | | |
|---|---|---|---|
| 2,844,238 | 7/1958 | Peterson | 192/67 R |
| 2,883,025 | 4/1959 | McKim | 192/67 R |
| 3,123,169 | 3/1964 | Young et al. | 192/67 R X |
| 3,442,361 | 5/1969 | Hegar | 192/67 R |
| 4,147,226 | 4/1979 | Kleespies | 192/67 R X |

OTHER PUBLICATIONS

Dana–Spicer Front Driving Axle (internal mount wheel hub).
Dana–Spicer Front Driving Axle (external mount wheel hub).

Primary Examiner—Rodney H. Bonck
Attorney, Agent, or Firm—Graybeal & Uhlir

[57] ABSTRACT

A locking clutch associated with a standard size wheel having a pilot hole opening therein, the clutch being of the type comprising a housing having the clutch mechanism therein including manual means for locking or unlocking the clutch means, the clutch housing comprising an outer body adapted to fit coaxially within the wheel pilot hole opening and having an annular flange at one end with a plurality of wheel stud openings matching the stud openings in the wheel, said annular flange being disposed between the vehicle wheel hub and the wheel and secured to both by the same mounting studs and stud nuts that secure the wheel to the wheel hub.

9 Claims, 4 Drawing Figures

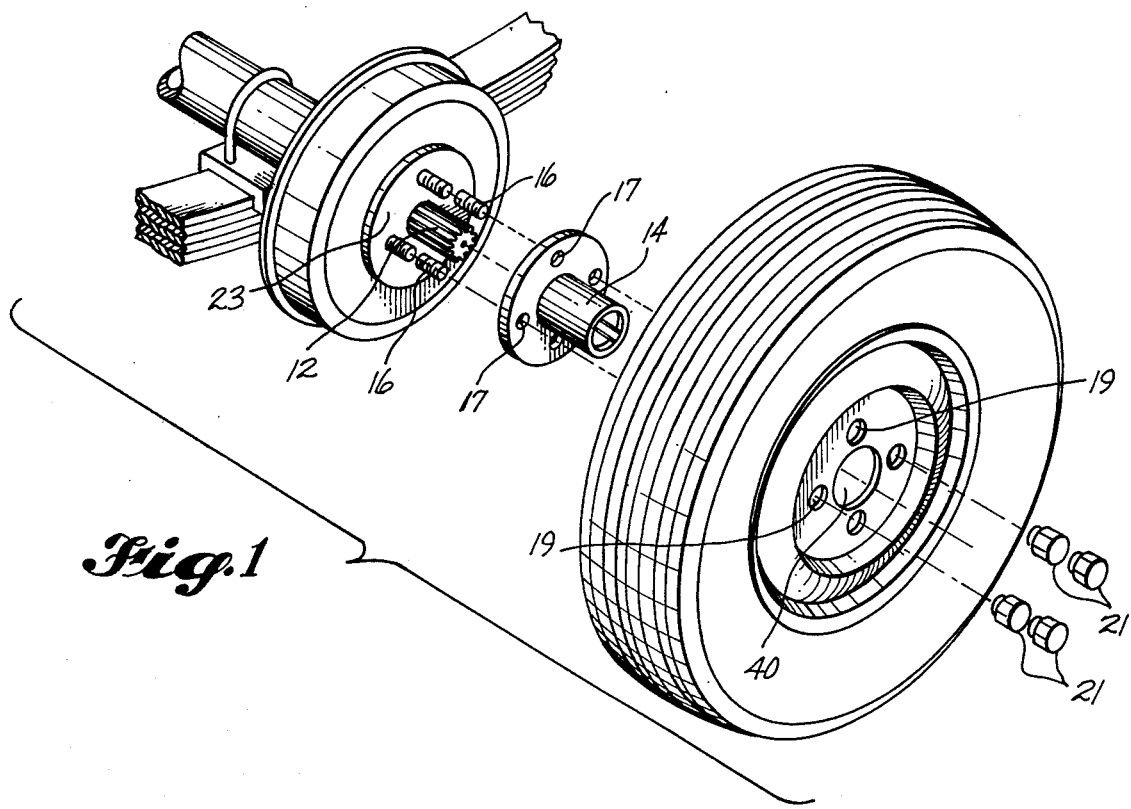

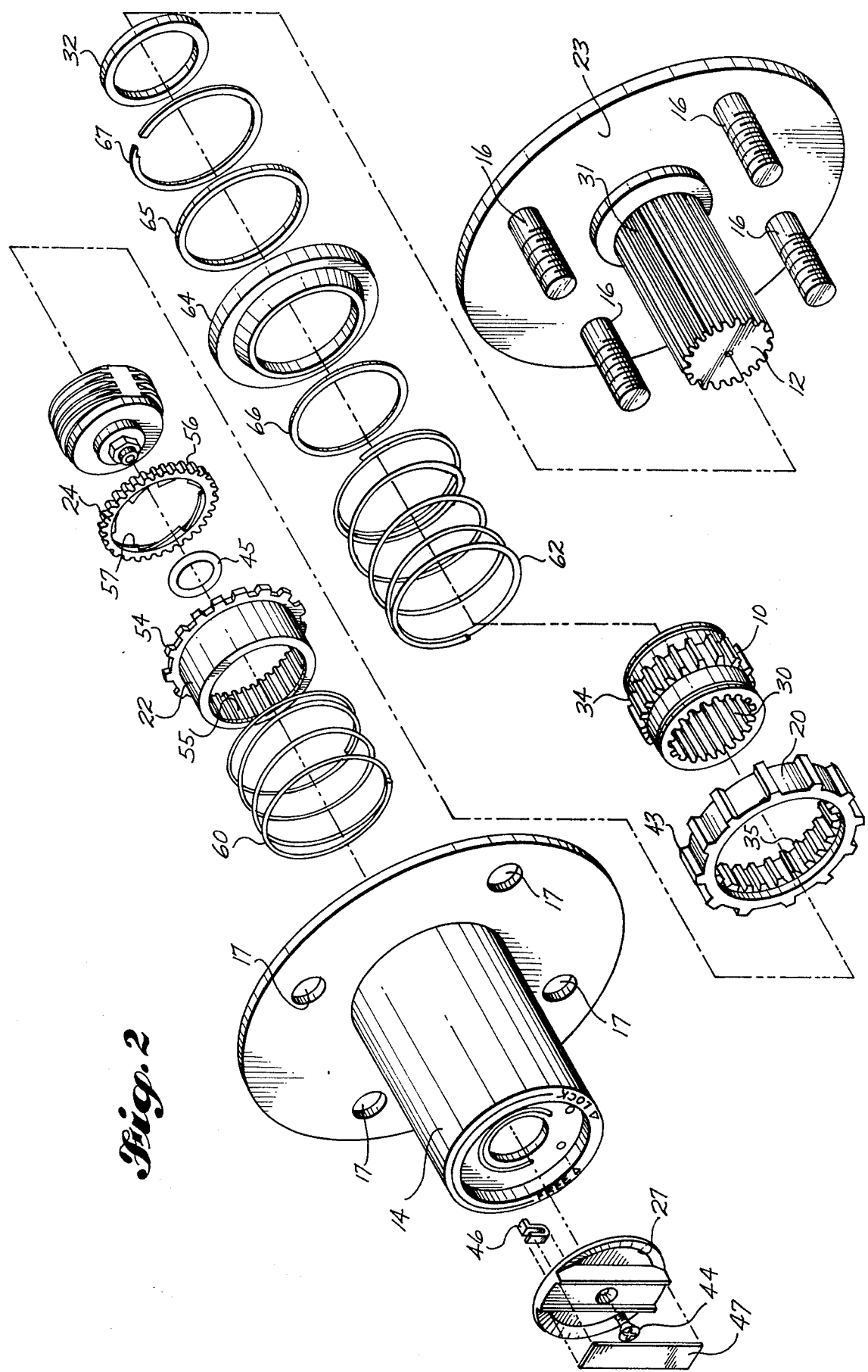

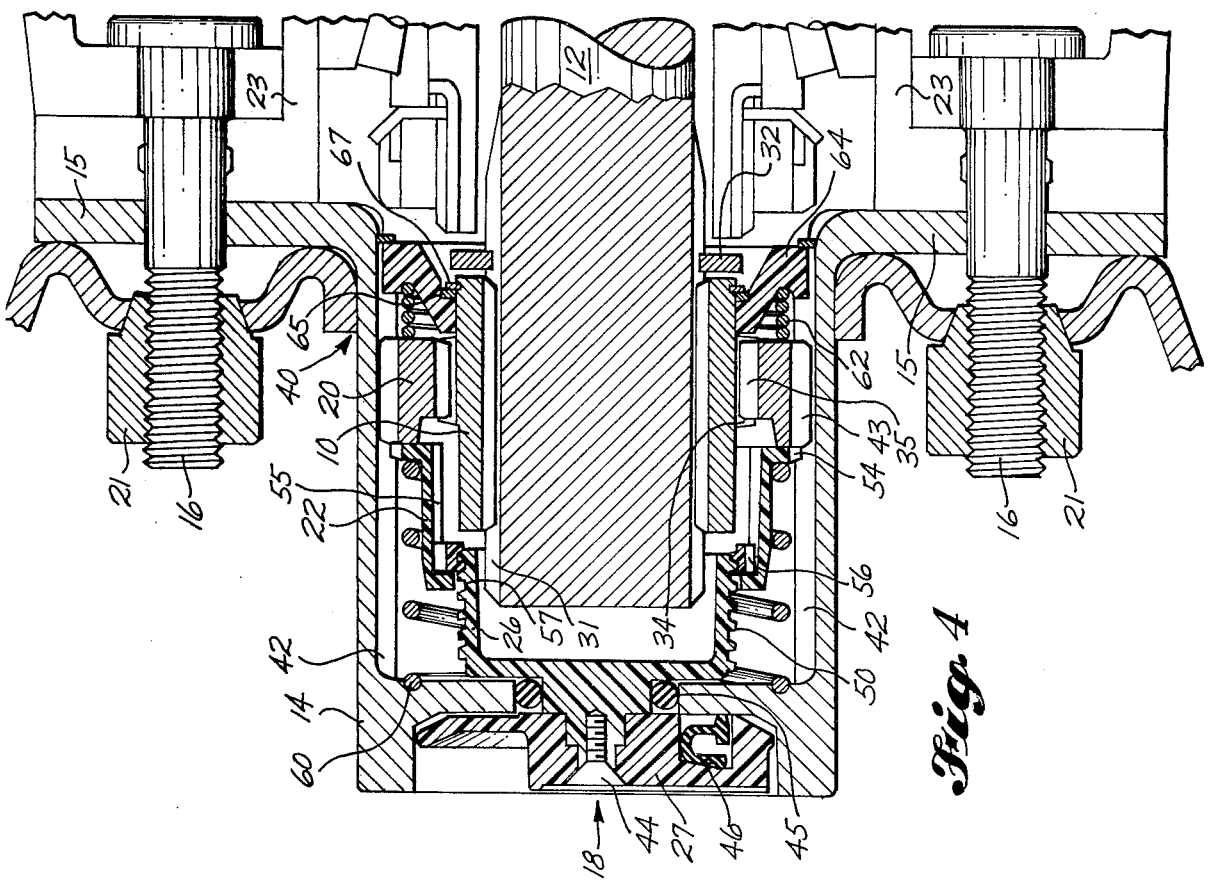
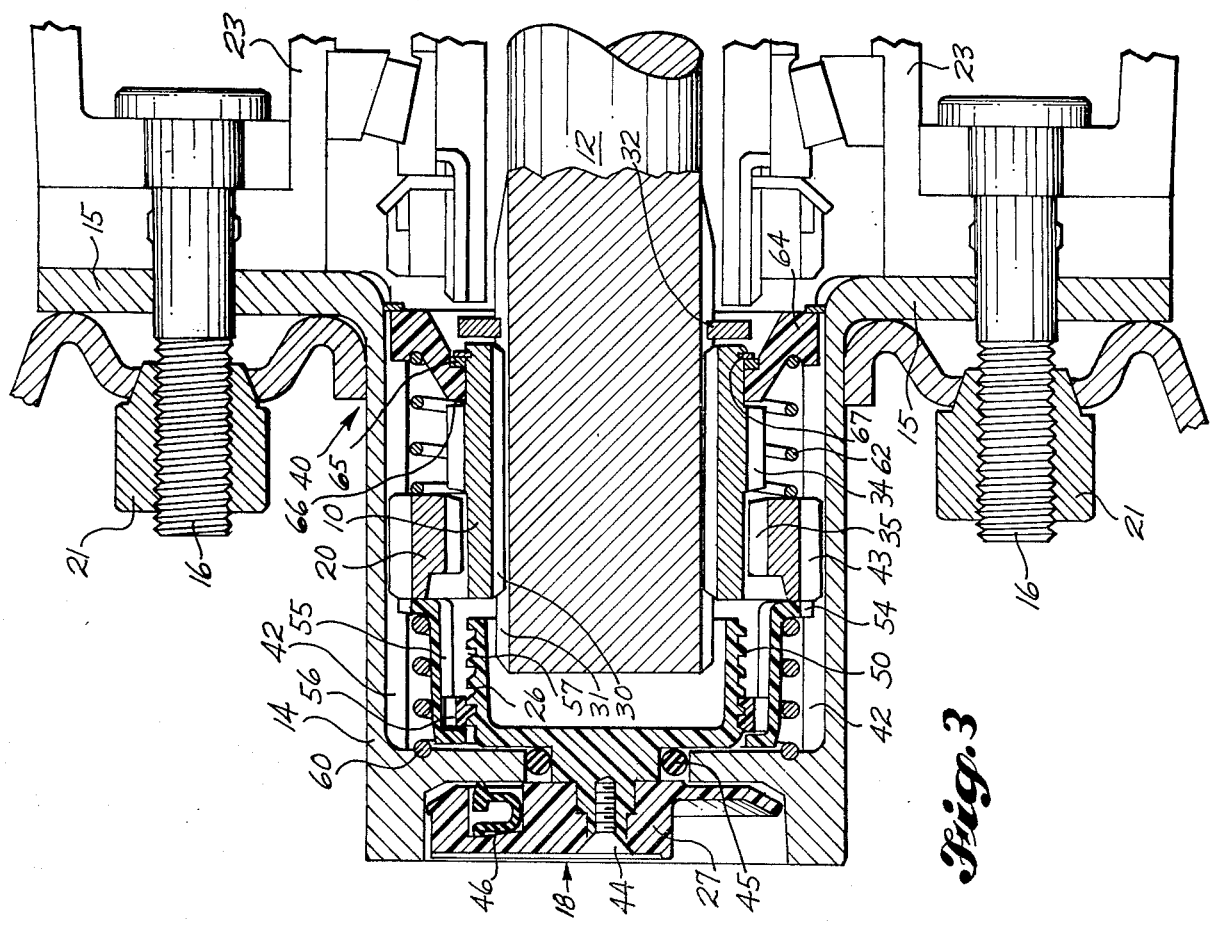

WHEEL STUD MOUNTED LOCKING CLUTCH

DESCRIPTION

1. Technical Field

This invention relates to a clutch means and more particularly to a wheel stud mounted locking clutch especially adapted for use on four wheel drive vehicles or the like having standard size wheels.

2. Background Art

In the prior art, one type of clutch adapted to mount with a wheel on a vehicle wheel hub is contained within a housing having an outside diameter that typically varies within a range of between four to four and one half inches. Such a housing is first secured to the wheel hub and the axle shaft by bolts or the like with the wheel being secured to the wheel hub by additional bolts, wheel mounting stud nuts or the like. This type of wheel mounted clutch has several disadvantages. The relatively large outside diameter of the housing usually requires a wheel having a large bolt pattern and one not adapted for mounting on smaller sized vehicles. In addition, different mounting bolts or studs are required for securing both the clutch housing and the wheel to the wheel hub.

The most compact wheel clutch previously known is contained within a housing having a relatively large outside diameter, typically three and one half inches. This clutch mechanism is adapted to coaxially fit through a wheel having a pilot hole opening of a similar diameter. This clutch has the same disadvantages as that characteristic of all larger diameter clutches. Since the trend in the automotive industry has been to downsize vehicles adapted for four wheel drive use or the like so as to be compatible with standard size wheels having pilot hole openings that are typically two and one half inches in diameter, this prior clutch is not well adapted for use with such standard size wheels.

The present invention provides a wheel stud mounted clutch adapted to be compatible with smaller sized vehicles having standard sized wheels. The clutch of the present invention is contained within an outer body adapted to be coaxially disposed within a standard wheel pilot hole opening having a two and one half inch diameter. The outer body has a substantially thin flange at one end having holes therein that match the stud openings on the wheel. The flange is adapted to be disposed adjacent the wheel and the vehicle wheel hub so as to be secured to the wheel and the wheel hub by the same mounting studs and stud nuts that secure the wheel to the wheel hub. By adapting the outer body to extend within the pilot hole opening, the clutch remains in place adjacent the wheel hub when the wheel is removed from the wheel hub. The substantially thin flange on the outer body allows securing the clutch to the wheel and to the wheel hub by use of a standard length wheel mounting stud.

DISCLOSURE OF THE INVENTION

According to one aspect of the present invention, a clutch is provided which is stud mounted along with a wheel having a standard size pilot hole opening therein, with the clutch being of the type comprising a housing having a clutch mechanism therein adapted to manually lock and unlock the wheel to the vehicle axle including a manually operable mechanism for doing same, the clutch housing comprising an outer body extending coaxially within the pilot hole opening. The outer body has an annular flange at one end thereon disposed between the wheel and the vehicle wheel hub with the annular flange having a plurality of wheel stud openings therein matching the plurality of stud openings on the wheel. The outer body is secured to the vehicle wheel hub and the wheel by the same studs and stud nuts securing the wheel to the vehicle wheel hub.

According to another aspect of the present invention, a vehicle wheel associated locking clutch comprises an axle shaft hub splined to the vehicle's axle shaft. An outer body is disposed coaxially around the axle shaft hub and in spaced apart relation therefrom with the outer body being adapted to extend within a pilot hole opening in the wheel. The outer body has an annular flange at one end disposed between the vehicle wheel hub and the wheel with the annular flange having a plurality of wheel stud openings therein matching the plurality of stud openings on the wheel. The outer body is secured to the vehicle wheel hub and the wheel by the same studs and stud nuts securing the wheel to the wheel hub. The outer body has a clutch ring slidably splined therein adapted to be urged into a splined engagement with the axle shaft hub. Manually operable means urges the clutch ring into a splined engagement with the axle shaft hub thereby locking the axle shaft to the outer body and the wheel.

It is a significant advantage of the present invention that by adapting the outer body to extend through a pilot hole opening of substantially two and one-half inches in diameter, the present invention may be used in conjunction with four wheel drive vehicles or the like having standard size wheels.

Another advantage of the present invention is that in a locked condition, the wheel stud mounted locking clutch transmits torque through the outer body directly to the wheel, thereby eliminating the need for additional torque responsive members within the clutch.

A still further advantage of the present invention is that by transmitting torque directly to the wheel through the outer body and not through the wheel hub, a lightweight locking clutch is produced.

A still further advantage of the present invention is that the annular flange on the outer body is sufficiently thin to allow the use of standard length wheel mounting studs to secure the clutch to both the wheel and the wheel hub.

The foregoing, and other objects, features, and advantages of the present invention will become more apparent in light of the detailed description of the preferred embodiments thereof set forth hereafter, and illustrated in the accompanying drawings.

BRIEF DESCRIPTION OF THE DRAWINGS

FIG. 1 is an exploded perspective view showing a typical wheel stud mounted locking clutch according to the present invention, associated with a vehicle axle shaft and vehicle wheel hub, and adjacent a wheel having a pilot hole opening therein.

FIG. 2 is an exploded perspective view of the wheel stud mounted locking clutch embodiment shown in FIG. 1.

FIG. 3 is a sectional view of the wheel stud mounted locking clutch shown in FIGS. 1 and 2, showing the clutch in the unlocked mode.

FIG. 4 is a sectional view of the wheel stud mounted locking clutch shown in FIGS. 1 and 2, showing the clutch in the locked mode.

BEST MODE OF CARRYING OUT THE INVENTION

As shown in FIG. 1, the wheel stud mounted locking clutch of the present invention is adapted to extend coaxially within the pilot hole opening of a standard sized wheel, engage the axle shaft of a four wheel drive vehicle or the like, and be secured to the vehicle wheel hub and the wheel by the same mounting studs and stud nuts that secure the wheel to the wheel hub. In this manner, the wheel may be removed from the vehicle, such as for changing or the like, while the locking clutch remains in place on the vehicle.

In the illustrated embodiment of the present invention, as perhaps best shown in FIG. 2, the wheel stud mounted locking clutch comprises an axle shaft hub 10 coaxially disposed about an axle shaft 12 and splined thereto. An outer body 14 is coaxially disposed about and in spaced apart relation from the axle shaft hub and secured to the vehicle by a plurality of wheel mounting studs 16 and stud nuts 21. Manually activated locking means, shown generally at 18, are disposed adjacent the axle shaft coaxially around and spaced apart from the inside surface of the outer body. The manually activated locking means 18 comprises a clutch ring 20 slidably splined to the inside surface of the outer body 14 and slidably engageable to the axle shaft hub 10. A clutch cup 22 is disposed adjacent the clutch ring and slidably splined to the inside surface of the outer body. A clutch nut 24 is disposed within the clutch cup and slidably splined therein with the clutch nut being in a threaded engagement with the dial screw 26 disposed adjacent the axle shaft hub and spaced apart therefrom.

The axle shaft hub 10 is coaxially disposed about a portion of the axle shaft 12 and is in engagement therewith by means of a plurality of splines 30 circumferentially disposed coaxially along the inside surface of the axle shaft hub 10 engaging a corresponding plurality of splines 31 disposed coaxially around a portion of the outside surface of the axle shaft 12. A retaining ring 32, disposed adjacent one end of the axle shaft hub 10 and around the axle shaft 12 further secures the axle shaft hub to the axle shaft. The axle shaft hub 10 has a plurality of splines 34 disposed circumferentially around the outside surface thereof adapted to engage a corresponding plurality of splines 35 disposed around the inside surface of the clutch ring 20.

The outer body 14 forms a housing for the wheel stud mounted locking clutch and is adapted to be disposed coaxially within a standard sized wheel having a wheel pilot hole opening, shown generally at 40, of substantially two and one half inches diameter. The outer body 14 has disposed at one end thereof a dial member 27 having the dial screw 26 attached thereto. A plurality of splines 42 disposed circumferentially around the inside surface of the outer body engage a corresponding plurality of splines 43 disposed circumferentially around the outside surface of the clutch ring 20. The opposite end of the outer body has disposed thereon an annular flange 15. The annular flange has a plurality of wheel stud openings 17 therearound that match the plurality of stud openings 19 on the wheel. With reference to FIGS. 3 and 4, the outer body 14 is disposed coaxially within the wheel pilot hole opening 40 in such a manner that the annular flange 15 is disposed between the vehicle wheel hub 23 and the wheel. The outer body is secured to the vehicle wheel hub and the wheel by the same plurality of mounting studs 16 and stud nuts 21 that secure the wheel to the wheel hub. With reference to FIGS. 3 and 4, it can be seen that the wheel studs 16 are themselves mounted to and are an integral part of the wheel hub 23. By using the same mounting studs and nuts, and by adapting the outer body to be coaxially disposed within a wheel pilot hole opening of substantially two and one half inches in diameter, the clutch of the present invention is adapted for use by any four wheel drive vehicle or the like using a standard size wheel. The outer body is constructed from forged steel with the annular flange 15 being substantially one-eighth of one inch in thickness. In this manner, the outer body may be secured to the vehicle wheel hub and the wheel by the use of standard length wheel studs 16 and associated stud nuts 21.

A clutch ring 20 is disposed circumferentially around the inside surface of the outer body 14 at one end of the axle shaft hub 10 and is in axially slidable splined engagement with the outer body by a plurality of splines 43 disposed circumferentially around the outside surface of the clutch ring. As will be discussed, the clutch ring is adapted to be manually urged into splined engagement with the axle shaft hub 10 thereby locking the axle shaft to the wheel. In the preferred embodiment, the clutch ring is constructed from a forged steel, such as 86L20 steel or the like.

A dial member 27 disposed adjacent the axle shaft hub 10 within the outer body 14 is secured to a dial screw 26 by a dial attaching screw 44, dial ring 45, the detent 46. The dial screw has a plurality of threads 50 circumferentially around the outside surface thereof adapted to threadably engage the clutch nut 24. The dial member 27 has a dial indicator 47 attached thereto and indicates either the LOCK or UNLOCK mode of operation for the clutch.

A clutch cup 22, disposed adjacent the clutch ring 20 and coaxially around the dial screw 26 in spaced apart relation therefrom, is in splined engagement with the outer body 14 through a plurality of splines 54 disposed circumferentially around the outside surface of the clutch cup 22 and by the corresponding plurality of splines 42 disposed upon the inside surface of the outer body 14. The clutch cup 22 has a plurality of splines 55 disposed circumferentially around the inside surface thereof which are adapted to engage a corresponding plurality of splines 56 disposed circumferentially around the outside surface of the clutch nut 24. The clutch nut 24 is in threaded engagement with the dial screw 26 by means of a plurality of threads 57 disposed circumferentially along the inside surface of the clutch nut 24. With particular reference to FIG. 2, it will be seen that clutch cup 22 and clutch ring 20 are both adapted to move axially along the inside surface of the outer body 14 as the dial member 27 is manually rotated, as for example by rotating the dial member 27 and dial indicator 46 from the UNLOCK to the LOCK position. The clutch nut 24 is adapted to be axially displaceable along the inside surface of the clutch cup 22.

Engagement spring 60, disposed between the clutch cup 22 and the end of the outer body having the dial member 27 disposed therein, urges the clutch ring 20 into splined engagement with the axle shaft hub 10 as the dial member 27 is rotated from the UNLOCK to the LOCK position. Disengagement spring 62, disposed adjacent the opposite end of the clutch ring 20, urges the clutch ring into a disengaged relation with the axle shaft hub 10 as the dial screw member is rotated from the LOCK position to the UNLOCK position.

Bearing 64, disposed coaxially around one end of the axle shaft hub 10 and in slidable contact with the inside surface of the outer body 14, allows free rotation of the outer body with respect to the axle shaft hub and maintains the outer body in spaced apart relation with respect to the axle shaft hub. The bearing is prevented from axial movement along the axle shaft hub by retaining ring 65 and split ring 67, and wear washer 66 disposed on opposite sides of the bearing. In the preferred embodiment, the bearing 64 is plastic, such as nylon or the like.

With particular reference to FIGS. 3 and 4, the operation of the wheel stud mounted locking clutch for both the LOCK and UNLOCK modes is next described.

LOCK Mode

When the clutch of the present invention is in the LOCK mode of operation, as for example with the dial indicator 46 rotated so as to point to the LOCK position, the slidable clutch ring 20 is urged into splined engagement with the axle shaft hub 10 by clutch cup 22 and engagement spring 60. In this mode of operation, clutch ring 20 is simultaneously splined to both the axle shaft hub 10 and the outer body 14, producing a continuous lockup between the axle shaft hub, the outer body, and the wheel for all rotational speeds therebetween. In such a situation, torque produced by the axle shaft is thereafter coupled directly through the outer body to the wheel.

If the clutch ring 20 does not immediately become splined to axle shaft hub 10, as occurs when splines 34 on axle shaft are misaligned with respect to splines 35 disposed around the inside surface of clutch ring 20, continued rotation of dial member 27 causes clutch nut 24 to be axially displaced along splines 55 disposed on the inside surface of the clutch cup. When alignment of the splines on the axle shaft hub and the clutch ring occurs, the engagement spring 60 urges clutch ring into splined engagement with the axle shaft hub and the clutch cup into an abutting relation with the clutch nut.

UNLOCK Mode

When dial member 27 and dial indicator 46 are rotated from LOCK position to UNLOCK position, the dial screw 26 pulls clutch nut 24 and clutch cup 22 axially away from clutch ring 20, thereby compressing engagement spring 60. When this occurs, disengagement spring 62 expands, thereby forcing clutch ring 20 axially along the splines disposed within inside surface of the outer body and out of splined engagement with axle shaft hub 10. The axle shaft hub is then free to rotate with respect to the wheel.

Industrial Applicability

The present invention has applicability in any situation where it is desired to provide a vehicle adapted for four wheel drive operation with a locking clutch associated with the wheel and the vehicle. By adapting the clutch of the present invention to fit within a wheel pilot hole opening, the clutch is particularly well adapted for four wheel drive vehicles or the like having standard sized wheels.

I claim:

1. In combination with a conventional downsize wheel and a conventional wheel hub of the type not extending through the pilot hole opening of the wheel when the wheel is bolted thereto, a clutch mechanism locking and unlocking the vehicle wheel to the vehicle axle including a manually operable means for doing same, the improvement wherein said clutch mechanism comprises an outer body extending outwardly through said pilot hole opening, said outer body further having an annular flange at the inward end thereon disposed between said vehicle wheel hub and said vehicle wheel, said flange having a plurality of wheel stud openings therein matching the plurality of stud openings in said vehicle wheel, said outer body being securable to said vehicle wheel by the same studs and stud nuts used to secure said vehicle wheel to said vehicle wheel hub such that when the clutch mechanism is locked, the clutch mechanism transfers the vehicle axle torque directly to the vehicle wheel.

2. The clutch of claim 1 wherein said outer body is forged steel.

3. The clutch of claim 1 wherein said annular flange on said outer body has a thickness of about one-eighth of one inch.

4. The clutch of claim 1 wherein said outer body is adapted to fit within a wheel pilot hole opening having a diameter of substantially two and one half inches.

5. A locking clutch for use in combination with a conventional downsize wheel and a conventional wheel hub of the type not extending through the pilot hole opening of the wheel when the wheel is bolted to the hub, the locking clutch engaging a vehicle axle shaft and comprising:
   (a) an axle shaft hub splined to said vehicle axle shaft;
   (b) an outer body disposed coaxially around said axle shaft hub and in spaced apart relation therefrom, said outer body extending outwardly through a pilot hole in said vehicle wheel and having an annular flange at the inward end thereon disposed between said vehicle wheel and said vehicle wheel hub, said flange having a plurality of wheel stud openings therein matching the plurality of stud openings in the vehicle wheel, said outer body being securable to said vehicle wheel and said vehicle wheel hub by the same studs and stud nuts as used to secure said vehicle wheel to said vehicle wheel hub, said vehicle wheel being thereby removable from said vehicle wheel hub while said outer body remains in place on the vehicle wheel hub;
   (c) a clutch ring being slidably splined to the inside surface of the outer body and urgable into splined engagement with said axle shaft hub; and,
   (d) manually operable means for urging the clutch ring into splined engagement with said axle shaft hub locking said axle shaft to said wheel such that axle shaft torque is transferred directly from the vehicle axle to the vehicle wheel.

6. The wheel mounted locking clutch of claim 5, wherein said outer body is constructed of forged steel.

7. The wheel mounted locking clutch of claim 5, wherein said annular flange on said outer body has a thickness of about one-eighth of one inch.

8. The wheel mounted locking clutch of claim 5, wherein said outer body is adapted to fit within a wheel pilot hole opening having a diameter of substantially two and one-half inches.

9. A vehicle wheel mounted locking clutch for engaging a vehicle axle shaft comprising:
   (a) an axle shaft hub splined to said vehicle axle shaft;
   (b) an outer body disposed coaxially around said axle shaft hub and in spaced apart relation therefrom, said outer body extending outwardly through the pilot hole opening and having an annular flange at the inward end disposed between said vehicle wheel and said vehicle wheel hub, the annular flange having a plurality of wheel stud openings therein matching the plurality of stud openings in said vehicle wheel, said outer body being securable to said vehicle wheel and said vehicle wheel hub by the same studs and stud nuts used to secure said vehicle wheel to said vehicle wheel hub with said vehicle wheel being removable from said vehicle wheel hub while said outer body remains in place on said vehicle wheel hub;

(c) a clutch ring slidably splined to the inside surface of said outer body and urgable into splined engagement with said axle shaft hub; and, (d) manually operable means for urging said clutch ring into splined engagement with said axle shaft hub locking said axle shaft hub to said vehicle wheel, said manually operable means comprising:

(1) a dial member disposed within said outer body adjacent said axle shaft and having a dial screw secured thereto with said dial screw extending coaxially around a portion of said axle shaft hub in spaced relation thereto;

(2) a clutch cup abutting said clutch ring and disposed around said dial screw in spaced relation thereto, with said clutch cup being axially slidable along and in splined engagement with the inside surface of said outer body;

(3) a clutch nut slidably splined to the inside surface of the clutch cup and being in a threaded engagement with said dial screw, said clutch nut movable axially along the splines of said clutch cup as said dial member is rotated; and, (4) means urging said clutch cup into said clutch ring and said clutch ring into splined engagement with said axle shaft hub as said dial member is rotated.

* * * * *